United States Patent [19]
Di Giacinto

[11] 3,879,892
[45] Apr. 29, 1975

[54] METHOD FOR FORCING WITLOOF

[76] Inventor: Joseph A. Di Giacinto, 535 Ocean Blvd., Coronado, Calif. 92118

[22] Filed: Nov. 16, 1973

[21] Appl. No.: 416,352

[52] U.S. Cl. .................................. 47/58; 47/1.2
[51] Int. Cl. ......................................... A01g 31/00
[58] Field of Search .............. 47/1.2, 3, 56, 58, 14, 47/16

[56] References Cited
UNITED STATES PATENTS

| 382,370 | 5/1888 | McCall | 47/3 |
|---|---|---|---|
| 2,189,510 | 2/1940 | Swaney | 47/1.2 |
| 2,205,303 | 6/1940 | Munsell | 47/1.2 |
| 3,362,106 | 1/1968 | Goldring | 47/56 |

FOREIGN PATENTS OR APPLICATIONS

| 496,226 | 10/1950 | Belgium | 47/16 |
|---|---|---|---|
| 516,693 | 1/1953 | Belgium | 47/3 |

*Primary Examiner*—Robert E. Bagwill
*Attorney, Agent, or Firm*—C. Michael Zimmerman, Esq.

[57] ABSTRACT

A method of forcing witloof from an endive root is described. After the endive root is conventionally grown in a field or the like, the foilage is removed therefrom and the end of such root is submerged and maintained in water for the forcing of the witloof from its reticle end. A cap of an opaque material is placed over the reticle end of the root, which cap defines a cavity conforming to a desired compact shape for the witloof. The witloof will develop into such cap which will not only provide the desired compact shape but also exclude light therefrom for blanching.

8 Claims, 4 Drawing Figures

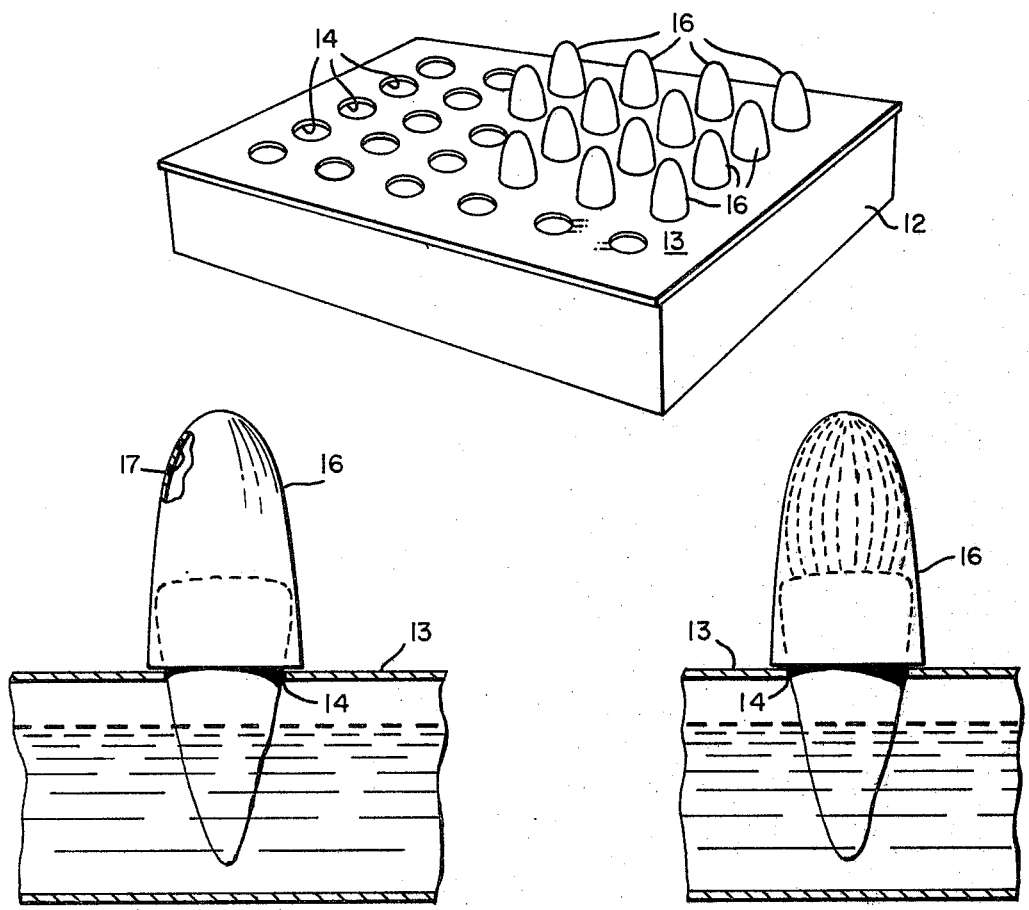
FIG. 1
FIG. 2
FIG. 3
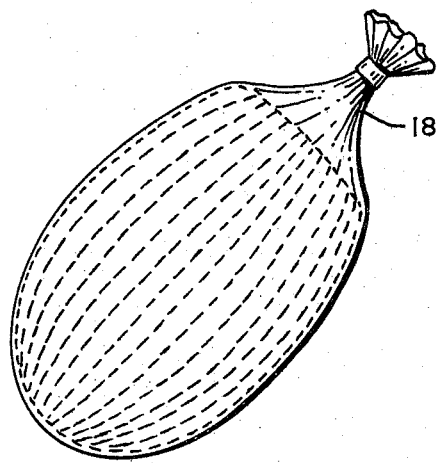
FIG. 4

METHOD FOR FORCING WITLOOF

BACKGROUND OF THE INVENTION

The present invention relates to the forcing of endive witloof and, more particularly, to a method of doing so which substantially reduces the amount of labor involved while at the same time providing a cleaner product.

Witloof, sometimes referred to more generally as endive, is extensively used in Europe as a main ingredient for salads. Witloof has not, however, found wide usage in the United States. The primary reason for this is that witloof is generally significantly more expensive than other leafy vegetables, such as lettuce, which are now being used. The major expense in commercially producing witloof is caused by the amount of labor which is required. Witloof is obtained by first conventionally growing an endive plant, typically *Cichorium Intybus*, from seeds within a field. After the plant matures and produces a tuberous root, the plants are gathered from the field and the foilage removed from the root. The root is then stored unitl such time as it is desired to actually produce the witloof. Then the desired witloof is "forced" from the root. That is, the root is placed into a box or other container and then completely covered with soil to a depth of approximately 8–10 inches. When maintained in such a condition for 3 to 4 weeks, the root produces the witloof beneath the top of the soil. The pressure of the soil on the witloof as it is being forced from the root causes such witloof to be compact and firm. The root is then dug up from the soil and the witloof separated therefrom for shipping to market. Before being shipped, however, it is necessary that the witloof be cleaned. That is, it is necessary to remove from the leaves, that soil which is on them due to the witloof being formed while covered with soil. Because a witloof is a relatively broad leafed, compact plant, this procedure requires considerable labor. Moreover, it is not practical to remove dirt from the central area of the plant, with the result that when the consumer receives a witloof, the interior thereof is much dirtier than a more typical plant which is grown above ground. Both the expense of producing the witloof and the seeming dirtiness of the final product have prevented the same from being accepted to any appreciable degree in the United States.

SUMMARY OF THE INVENTION

The present invention provides a method of forcing witloof from an endive root which eliminates the labor involved in cleaning the witloof while providing a product which is both compact and clean. More particularly, it has been found that witloof can be forced from an endive root merely by maintaining the tip end of the root submerged in water or other acqueous medium. Further, if light is excluded from the witloof during such time as it is being forced from the root, the resulting witloof will have the blanched character typical of good witloof. Also, if the witloof is made to develop within a cavity which conforms to a desired compact witloof shape, the witloof will have the firmness and compactness which signifies to a consumer that the witloof is fresh and of good quality. Thus, in its broad aspects, the method of the invention comprises the steps of placing the tip end of a root in an acqueous meduim, such as water, maintaining such root tip submerged in the acqueous medium until the witloof is forced from the root, and thereafter separating the witloof from the endive root. Most desirably, the method further includes the steps of excluding light from the witloof during such time as it is being formed so that the resulting witloof is blanched. It further desirably includes the step of placing the open end of a cavity which conforms to a desired compact witloof shape over the reticle end of the root (the end opposite the root tip) while the endive is being forced, whereby such witloof will develop within the cavity and will thereby be shaped into the desired compact form.

The invention includes other features and advantages which will become apparent from the following more detailed description of a preferred embodiment.

BRIEF DESCRIPTION OF THE DRAWING

With reference to the accompanying single sheet of drawing:

FIg. 1 is a perspective view of a container for an acqueous medium and a stand in position to support endive roots with their tip ends maintained in the acqueous medium;

FIg. 2 is a sectional view of the arrangement of FIG. 1 illustrating an endive root maintained in position for the forcing of witloof;

FIG. 3 is a sectional view similar to FIG. 2 but illustrating the arrangement with a witloof forced from the endive root; and FIG. 4 is an elevation view of a witloof packed for shipping within the same cap which is utilized to form the witloof into a desired compact shape.

DETAILED DESCRIPTION OF THE PREFERRED EMBODIMENT

The method of the invention will be best understood with reference to the enclosed drawing. FIG. 1 illustrates an apparatus, generally referred to by the reference numeral 11, which is especially adapted for use in performing aspects of the invention. More particularly, a container of receptacle 12 is illustrated for holding water to a depth of, for example, 4 or 5 inches. A stand is provided on the top of the container for supporting the root of endive plants with their tip ends submerged in the water within the container. More particularly, a board or plate 13 is provided over the top of the container with a plurality of apertures or holes 14. Each hole 14 is sized to allow the tip end of an endive root to be inserted therethrough and maintained in a vertical position by engagement of its upper end with the periphery of the aperture.

Means are also provided for assuring that the witloof forced from any endive root supported with its tip end submerged in the water of the container by the plate 13 has a compact shape. That is, as is best illustrated in FIG. 2, such means is preferably in the form of a cap 16 placed over the reticle end of each of the roots which extends above the plate 13. Such means defines a cavity 17 conforming to the desired shape for a witloof. That is, as can be seen from FIGS. 2 and 3, the interior surface of the cavity is generally conical with a rounded apex. The reticle end of the root extends into the open end of such cavity. The result is that as the witloof develops into the cavity, its outer leaves engage the sidewall of the cap and are forced inwardly. This will result in the witloof being compacted in generally the same manner as it is compacted when it is subjected to the pressure of soil. In this connection, it is important that the material of the cap be sufficiently inelastic not to appreciably stretch when subjected to the pressure of the growing witloof. To this end, the cap can be of, for example, a so-called "rigid" vinyl of the type commonly used in the food packaging industry. FIG. 3 illustrates a witloof forced from an endive root into a cap 16.

For good quality witloof, it is also important that light be excluded therefrom while it is being forced from an endive root. Such light exclusion is simply obtained by making the cap 16 of an opaque material. Thus, such cap will not only provide the desired shaping of the witloof into a compact form, but will also assure that the resulting witloof will be blanched by such light exclusion.

The cap 16 used for shaping the witloof is also useable as a bag or container for the witloof after it is removed from the root. More particularly, if the bag is of a flexible, yet inelastic material, such as of a relatively thin, e.g., 5 mil, sheet of polyethylene, the open end of such bag can be gathered, such as is illustrated at 18 in FIG. 4, and closed. The packaging of the witloof in this manner directly after it is forced facilitates its transportation and also assures that a clean product is delivered to the marketplace.

If the cap is to be used not only to shape the witloof, but also as a package therefor for shipping to markets, it is most desirable that such cap be of a transparent material so that consumers are able to visually inspect the packaged witloof before purchasing it. If the cap is made of a clear material, it will be appreciated that in order to obtain the desired blanching, the root forcing operation must take place in a darkened area so that the desired exclusion of light will be effected.

While the method of the invention has been described in connection with a preferred embodiment thereof, it will be appreciated by those skilled in the art that various modifications and changes can be made without departing from its spirit. It is therefore intended that the coverage afforded applicant be limited only by the claims and their equivalent language.

I claim:

1. A method of forcing witloof from an endive root comprising the steps of providing a root of an endive plant, placing the tip end of said root in an aqueous medium, placing the open end of a cavity having a generally conical interior surface with a rounded apex over the reticle end of said root while the root tip is maintained in said aqueous medium, whereby said witloof will develop into said cavity upon being forced from said root and will thereby be shaped into a desired compact form, maintaining said root tip submerged in said aqueous medium and said reticle end of said root out of contact with said aqueous medium until such time as said witloof is forced from said root, excluding light from the witloof while it is being forced from said root whereby said witloof is blanched, and thereafter separating said witloof from said endive root.

2. The method of claim 1 for forcing witloof from an endive root wherein said cavity is defined by a cap of a material which is opaque to thereby provide both the desired shaping of said witloof into a compact form and the exclusion of light therefrom for blanching.

3. A method of forcing witloof from an endive root comprising the steps of cultivating an endive seed to produce an endive plant, removing the foliage from said plant to leave a root, providing a receptacle containing an aqueous medium and a stand for supporting said root with its tip end in the aqueous medium within said receptacle, placing said root in said stand with its tip end submerged in said aqueous medium and its reticle end projecting thereabove, maintaining said root in said stand with its tip end submerged in said aqueous medium until such time as said witloof is forced from said root, excluding light from the witloof while it is being forced from said root whereby said witloof is blanched, and thereafter separating said witloof from said endive root.

4. The method of claim 3 for forcing witloof from an endive root further including the step of placing the open end of a cavity having a generally conical interior surface with a rounded apex over the reticle end of said root while the root tip is maintained in said aqueous medium, whereby said witloof will develop within said cavity upon being forced from said root and will thereby be shaped into a desired compact form.

5. The method of claim 4 for forcing witloof from an endive root wherein said cavity is defined by a cap of a generally flexible, inelastic material, and further including the step of transporting said witloof within said cap as a container therefor after the forced witloof is separated from said endive root.

6. A method of providing witloof comprising the steps of providing a root of an endive plant, placing and maintaining the tip end of said root in contact with a root forcing medium while maintaining the reticle end of said root out of contact with said root forcing medium, providing means defining an open ended cavity having a generally conical interior surface with a rounded apex, placing the open end of said cavity over the recticle end of said root while said root is maintained in contact with said forcing medium whereby said witloof will develop within said cavity upon being forced from said root and will thereby be shaped into a desired compact form, and excluding light from the witloof while it is being forced from said root whereby said witloof is blanched.

7. The method of claim 6 wherein said cavity is defined by a cap of a generally flexible, inelastic material, and further including the step of transporting said witloof within said cap as a package therefor after the forced witloof is separated from said endive root.

8. The method of claim 6 wherein said cavity is defined by a cap of a material which is opaque to thereby provide both the desired shaping of said witloof into a compact form and the exclusion of light therefrom for blanching.

* * * * *